(12) United States Patent
Kunert

(10) Patent No.: US 10,846,732 B1
(45) Date of Patent: Nov. 24, 2020

(54) VIDEO-BASED TRANSACTION SYSTEM

(71) Applicant: James M. Kunert, Roseburg, OR (US)

(72) Inventor: James M. Kunert, Roseburg, OR (US)

( * ) Notice: Subject to any disclaimer, the term of this patent is extended or adjusted under 35 U.S.C. 154(b) by 0 days.

(21) Appl. No.: 16/876,467

(22) Filed: May 18, 2020

(51) Int. Cl.
*G06Q 30/02* (2012.01)
*G06Q 20/08* (2012.01)
*G06Q 20/12* (2012.01)
*H04N 21/231* (2011.01)
*H04N 21/845* (2011.01)
*H04N 21/2187* (2011.01)
*H04N 21/81* (2011.01)

(52) U.S. Cl.
CPC ....... *G06Q 30/0235* (2013.01); *G06Q 20/085* (2013.01); *G06Q 20/127* (2013.01); *H04N 21/2187* (2013.01); *H04N 21/231* (2013.01); *H04N 21/812* (2013.01); *H04N 21/8456* (2013.01)

(58) Field of Classification Search
CPC ............. G06Q 30/0235; G06Q 20/085; G06Q 20/127; H04N 21/231; H04N 21/2187; H04N 21/812; H04N 21/8456
See application file for complete search history.

(56) References Cited

U.S. PATENT DOCUMENTS

| | | | |
|---|---|---|---|
| 6,609,112 B1 | 8/2003 | Boarman et al. | |
| 6,996,413 B2 | 2/2006 | Inselberg | |
| 7,248,888 B2 | 7/2007 | Inselberg | |
| 8,718,612 B2 | 5/2014 | Calman et al. | |
| 9,665,895 B2 | 5/2017 | Alston | |
| 2006/0111985 A1 | 5/2006 | Sheldon et al. | |
| 2011/0145087 A1* | 6/2011 | Daman | H04L 67/12 705/26.3 |
| 2013/0179295 A1 | 7/2013 | Harris | |
| 2013/0297400 A1* | 11/2013 | Nagarajan | G06Q 30/02 705/14.35 |
| 2015/0089020 A1* | 3/2015 | Altman | H04L 65/4084 709/217 |
| 2017/0068984 A1* | 3/2017 | Joshi | G06Q 20/3276 |
| 2017/0111667 A1* | 4/2017 | Shaw | H04N 21/2387 |

\* cited by examiner

*Primary Examiner* — Hai V Tran
(74) *Attorney, Agent, or Firm* — Goldstein Law Offices, P.C.

(57) ABSTRACT

A video-based transaction system for facilitating the transfer or provision of a transaction subject in return for payment, comprising a plurality of user devices, a transaction server for managing a transaction opportunity associated with the transaction subject, and a transaction video server adapted to stream live promotional video content to the users devices, the transaction opportunity has an offer value and an offer duration, and the transaction server progressively decrements the offer value until the offer duration expires or a buyer user submits a transaction response via one of the user devices, whereby the transaction server is adapted to refer the buyer user to a payment platform to finalize the transaction.

15 Claims, 9 Drawing Sheets

VIDEO-BASED TRANSACTION SYSTEM

TECHNICAL FIELD

The present disclosure relates generally to a system for facilitating internet-based transactions. More particularly, the present disclosure relates to a system for delivering live promotional video content in support of transaction opportunities having an offer value which decrements over time.

BACKGROUND

Internet marketplaces offering auction-based sales of items are familiar to buyers and sellers alike. However, conventional auctions-based marketplaces in which multiple buyers submit increasing bids in an attempt to win auctions have several drawbacks. Auctions are typically conducted over the course of a fixed time period, with the highest bidder being the winner of the auction at the conclusion of the auction. Common bidder behavior often results in unsatisfactory outcomes for both buyers and sellers. For example, competitive bidding can drive up the price of items to a point where many bidders become discouraged, while the winning bidder is forced to spend more money than the bidder originally anticipated. Such auctions frequently attract a burst of early bidding activity which discourages less determined bidders, resulting in very little bidding activity for the remainder of the auction period. Although the seller may benefit from selling the item at a high price, bidder fatigue hurts the overall viability of the marketplace. Conversely, many bidders will withhold their bids until the last few seconds of the auction, resulting in a far lower selling price than the seller would prefer. In both situations, the auctions continue for the entirety of their auction periods regardless of bidding activity, resulting in an inefficient consumption of valuable computing resources.

Furthermore, conventional auction-based marketplaces do not provide sellers with the opportunity or tools to effectively promote the item being sold or otherwise directly engage potential bidders through live demonstrations. Although the value of live promotional video content is well known, most sellers will lack the time, capability, and resources to prepare and deliver live promotional video content.

It is therefore apparent that a need exists for a system which facilitates the transfer or provision of items using a decrementing price, whereby the price of the item steadily decrements over time, allowing the first buyer to submit a response to be provided to the item at the decremented price. In addition, such system allows live promotional video content to be transmitted to buyers in real-time to encourage buyer responses, and further allows transaction administrators to create and manage transactions and promotional video content on behalf of sellers.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for facilitating a transaction to purchase an item, while further delivering video content to buyers to encourage completion of the transaction. Accordingly, the present disclosure provides a video-based transaction system comprising a transaction server adapted to manage and execute a transaction opportunity associated with a transaction subject, a transaction video server adapted to store and stream promotional video content related to the transaction opportunity, and a plurality of user devices adapted to allow a plurality of buyer users to view the promotional video content and submit a transaction response, whereby the transaction server is adapted to end the transaction opportunity once the first transaction response is received, allowing the buyer user who submitted the transaction response to purchase the transaction subject.

It is another aspect of an example embodiment in the present disclosure to provide a video-based transaction system in which the price of the item decreases over time until the transaction opportunity expires. Accordingly, the transaction opportunity has an offer duration, an offer value, a decrement interval, and a decrement value, whereby the offer value will be decremented by the decrement value every time the decrement interval elapses, until the expiration of the offer duration. Furthermore, in certain embodiments, the transaction opportunity will end upon the offer value reaching a minimum value.

It is yet another aspect of an example embodiment in the present disclosure to provide a video-based transaction system in which the promotional video content live footage is delivered to the buyer users in real-time. Accordingly, the video-based system further comprises a video upload device and camera, whereby live footage captured by the camera is uploaded to the transaction video server for transmission to the buyer users in real-time. Furthermore, the transaction server is adapted to synchronize the live promotional video content with the transaction opportunity.

It is still a further aspect of an example embodiment in the present disclosure to provide a video-based transaction system in which a class of user, distinct from the owner or provider of the transaction subject, is granted user privileges and transaction controls to create and manage transaction opportunities. Accordingly, the video-based transaction system further comprises a transaction administrator device which allows a transaction administrator user to create and manage each transaction opportunity on behalf of a transaction originator.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
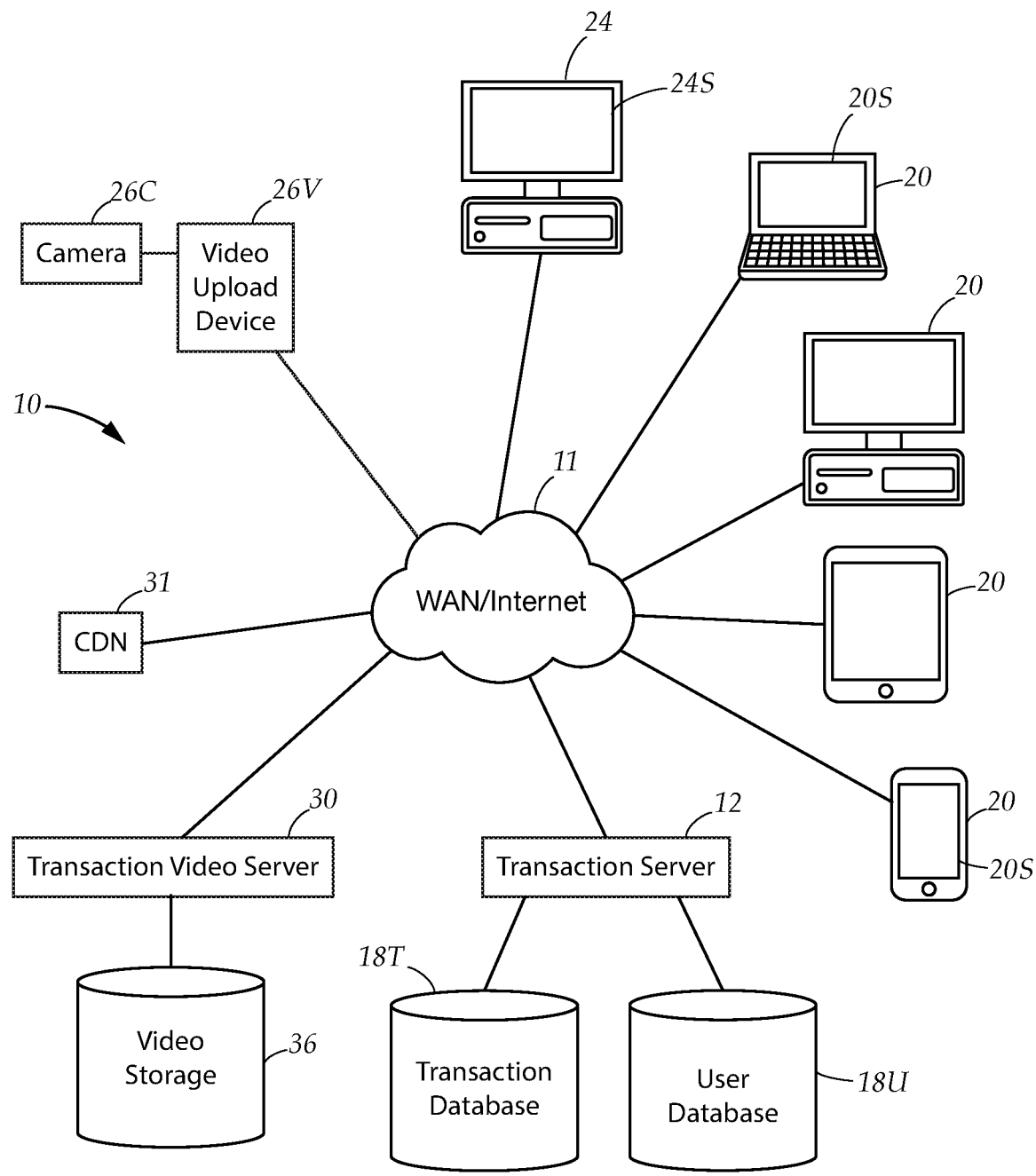
FIG. 1 is a block diagram depicting a video-based transaction system, in accordance with an embodiment in the present disclosure.

FIG. 1 illustrates a video-based transaction system 10 for conducting transaction opportunities for the sale of items, with each transaction opportunity being supported by promotional video content. Each transaction opportunity signifies an offer to transfer or otherwise provide a transaction subject, which can be an item, good, or product, in return for payment of an offer value. The transaction opportunity ends upon the expiration of an offer duration, or upon a buyer choosing to accept the offer. Furthermore, once the transaction opportunity is begun, the offer value will steadily decrease until the transaction opportunity ends, or until the offer value reaches a minimum value.

Figure 2:
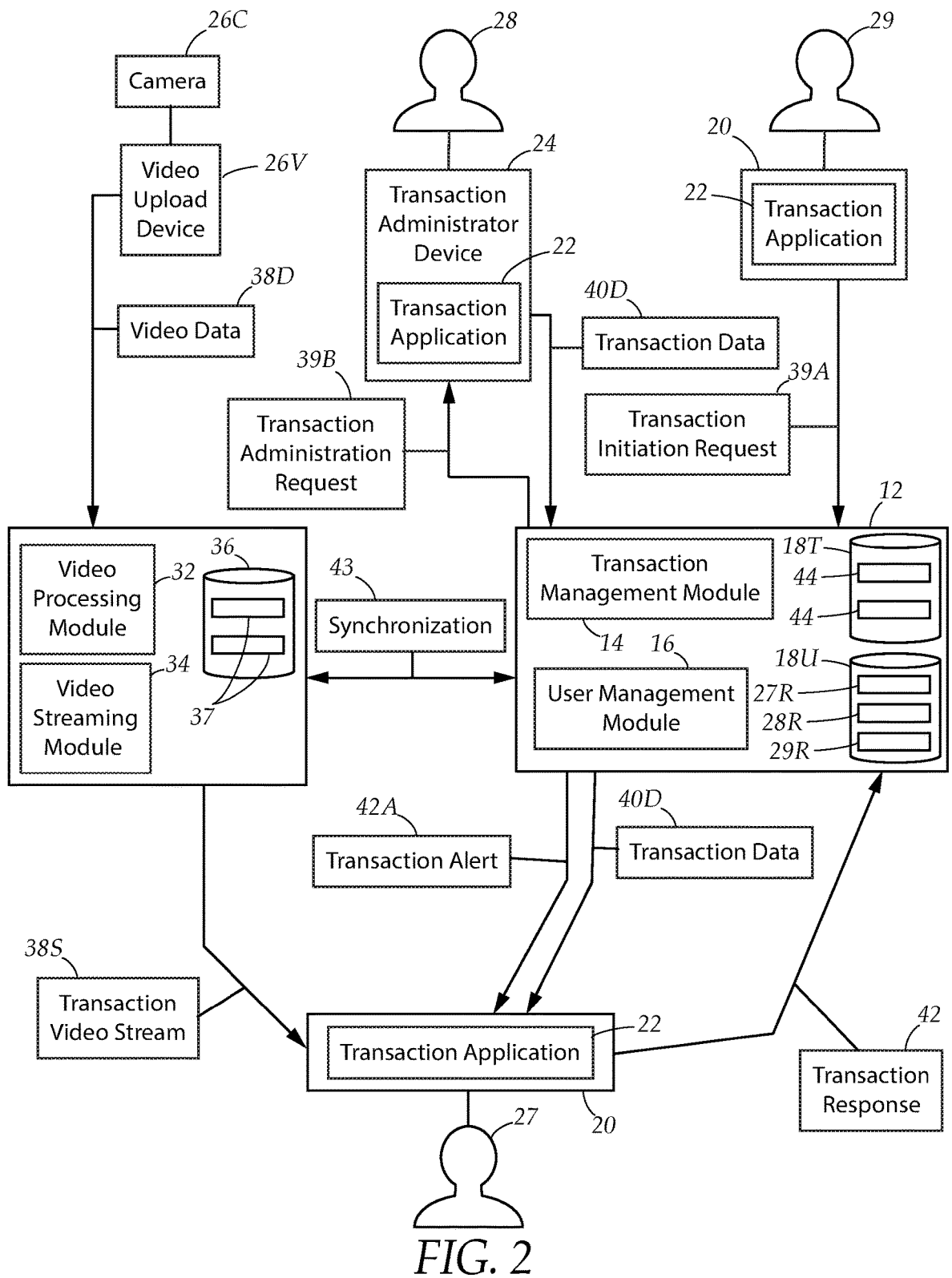
FIG. 2 is a block diagram depicting interactions between a transaction server, a transaction video server, a transaction administrator device, and a user device while executing a transaction opportunity, in accordance with an embodiment in the present disclosure.

Turning to FIG. 2 while continuing to refer to FIG. 1, the video-based transaction system 10 has a plurality of user classes, including a plurality of buyer users 27, at least one transaction administrator user 28, and at least one transaction originator 29. The transaction originator 29 has possession of or is responsible for providing the transaction subject, while the transaction administrator user 28 is responsible for creating and overseeing the transaction opportunity by which the transaction subject is offered. Each buyer user 27 is able to view the transaction opportunities, and will be provided the option to purchase the transaction subject. In a preferred embodiment, the video-based transaction system 10 comprises a transaction video server 30 adapted to store or transmit video content, a transaction server 12 adapted to conduct the transaction opportunities, a plurality of user devices 20 which allow the buyer users 27 and the transaction originator 29 to access the video-based transaction system 10, and a transaction administrator device 24 providing transaction controls to the transaction administrator user 28. The transaction server 12, transaction video server 30, the user devices 20, and the transaction administrator device 24 are operably connected via a data communication network 11, such as the Internet.

In one embodiment, the transaction server 12 has a transaction management module 14 which allows transaction opportunities to be created, executed, and finalized, as well as a user management module 16 adapted to allow user accounts to be created and maintained. The transaction server 12 may be implemented via a computing device having a processor, memory, communication module adapted to communicate via the data communication network 11, and a server storage device. The transaction server 12 further has a transaction database 18T and a user database 18U which are maintained via the server storage device. For example, the user accounts may be managed using buyer user records 27R, transaction administrator user records 28R, and transaction originator records 29R, which record the user class and profile information for each user.

The transaction video server 30 is adapted to receive, store, and transmit promotional video content associated with the transaction opportunities via the data communication network 11, and may be implemented using any suitable computing device. For example, the transaction video server 30 may be implemented using media server technology employed for processing and delivering internet-based video. In one embodiment, the transaction video server 30 has a video processing module 32 adapted to receive, encode, and process video data 38D to produce transaction video files 37 suitable for use with the video-based transaction system 10. The video data 38D includes pre-recorded video files as well as live video feeds. The transaction video server 30 further has a video storage device 36 for storing the transaction video files 37, and a video streaming module 34 adapted to transmit the transaction video files 37 to the user devices 20 in the form of a transaction video stream 38S using a suitable streaming video protocol, as will be apparent to a person of ordinary skill in the art in the field of the invention. In certain embodiments, the encoding, storage, and transmission of the promotional video content may be performed using a distributed network such as a content delivery network 31.

Referring to FIGS. 1 and 2, the user devices 20 may be computing devices such as personal computers, smartphones, tablets, which have a user device screen 20S, an input device for accepting user commands, and which are adapted to communicate via the data communication network 11. The transaction administrator device 24 is substantially similar to the user device 20, and has a transaction administrator device screen 24S. The user device 20 and transaction administrator device 24 are adapted to allow each of the users to interact with the video-based transaction system 10 using commands appropriate to the user class. In one embodiment, the user devices 20 and the transaction administrator device 24 are adapted to execute a transaction application 22 to facilitate the user interactions with the video-based transaction system 10. The user interactions may also be facilitated using a website which substantially replicates the functions of the transaction application 22 and is accessible by the user and transaction administrator devices 20, 24.

Figure 3:
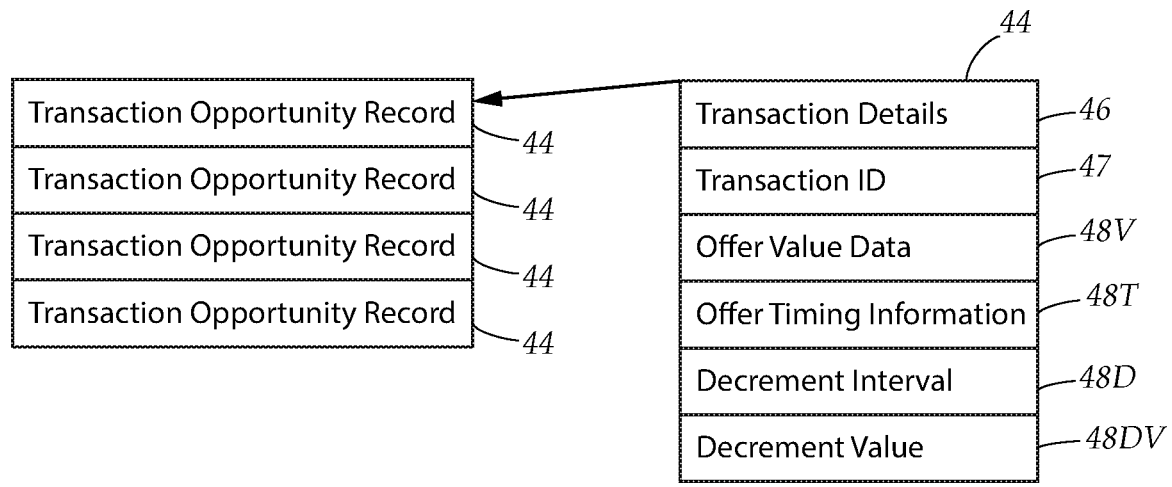
FIG. 3 is a block diagram depicting an exemplary transaction opportunity record containing transaction details, in accordance with an embodiment in the present disclosure.

Turning to FIG. 3 while also referring to FIG. 2, the transaction application 22 allows the transaction originator 29 to register with the video-based transaction system and send a transaction initiation request 39A to the transaction server 12. The transaction initiation describes the transaction subject, and includes pricing information such as a starting price and a minimum price. The transaction management module 14 is adapted to receive and process the transaction initiation request 39A, and will notify the transaction administrator user 28 via a transaction administration request 39B sent to the transaction administrator device 24. In a preferred embodiment, the transaction application 22 provides the transaction administrator user 28 with transaction controls which allow the transaction opportunity to be created and edited.

Each transaction opportunity that is created has an associated transaction opportunity record 44 stored within the transaction database 18T, and each transaction opportunity record 44 contains a plurality of transaction details 46. In one embodiment, the transaction details 46 comprise a transaction ID 47 which uniquely identifies the associated transaction opportunity, offer value data 48V, and offer timing information 48T. The offer value data 48V includes an offer value corresponding to a monetary value necessary to finalize the transaction opportunity, and may also include a minimum offer value. The offer timing information 48T includes the offer duration, as well as a start time. The transaction details 46 further comprise a decrement interval 48D representing an amount of time, and a decrement value 48DV corresponding to a monetary value. Once the transaction opportunity is executed, the transaction management module 14 will steadily decrement the offer value every time the decrement interval 48D elapses, by an amount equal to the decrement value 48DV. The transaction management module 14 may automatically execute the transaction opportunity at the appropriate start time. The buyer users 27 will be allowed to transmit transaction responses 42 at any time between the time the transaction opportunity is executed, until the transaction opportunity ends. Furthermore, once the first transaction response 42 associated with the transaction opportunity is received by the transaction server, the transaction opportunity ends and no more transaction responses 42 may be entered by the buyer users 27.

In one example, the offer duration may be sixty minutes, with an offer value of $100, a decrement interval 48D of ten minutes, and a decrement value of $10. Thirty minutes after the transaction opportunity begins, the offer value will have been decremented three times, resulting in the decremented offer value of $70. The transaction management module 14 will end the transaction opportunity once the offer duration expires, the decremented offer value reaches the minimum offer value, or if one of a transaction response 42 is received by the transaction server 12 from one of the user devices 20 of the buyer users 27. Note that this example is non-limiting, and the transaction details 46 may be set to any values as appropriate and in adherence to the principles of the present disclosure.

Figure 5A:
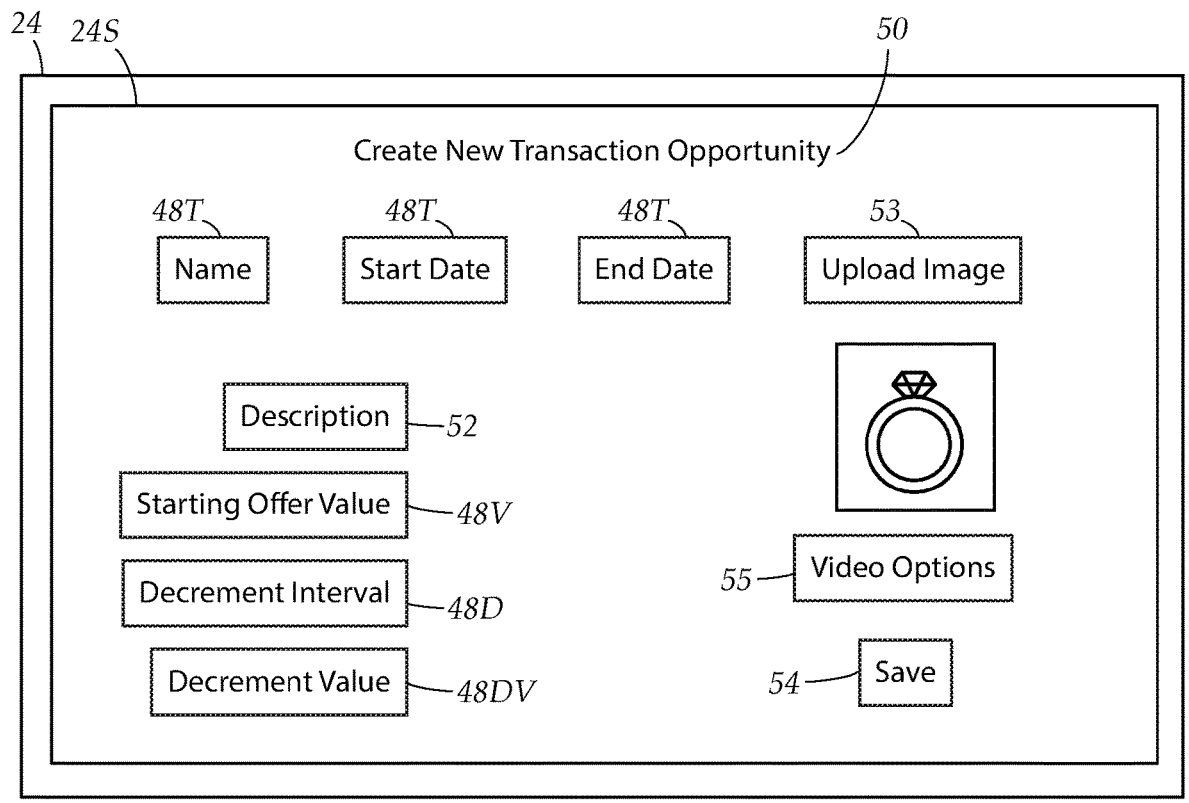
FIG. 5A is a diagrammatical front view of a transaction administrator device, depicting a transaction opportunity creation interface, in accordance with an embodiment in the present disclosure.

Turning to FIG. 5A while also referring to FIGS. 2 and 3, the transaction application 22 is adapted to display a transaction opportunity creation interface 50 to the transaction administrator user via the administrator user device screen 24S. The transaction opportunity creation interface 50 allows the transaction administrator user 28 to create a transaction opportunity and define its transaction details 46. For example, the transaction administrator user 28 may define the offer timing information 48T, enter a description 52 of the transaction subject, upload 53 an image depicting the transaction subject, as well as define the offer value data 48V, the decrement interval 48D, and the decrement value 48DV. The transaction application will also allow the transaction administrator 28 to define video options 55 which control the promotional video content associated with the transaction opportunity. The transaction details 46 are transmitted to the transaction server as transaction data 40D. Once all the relevant transaction details 46 have been entered, the transaction creation interface 50 allows the transaction opportunity to be saved 54, resulting in the creation of its transaction opportunity record 44.

Figure 5B:
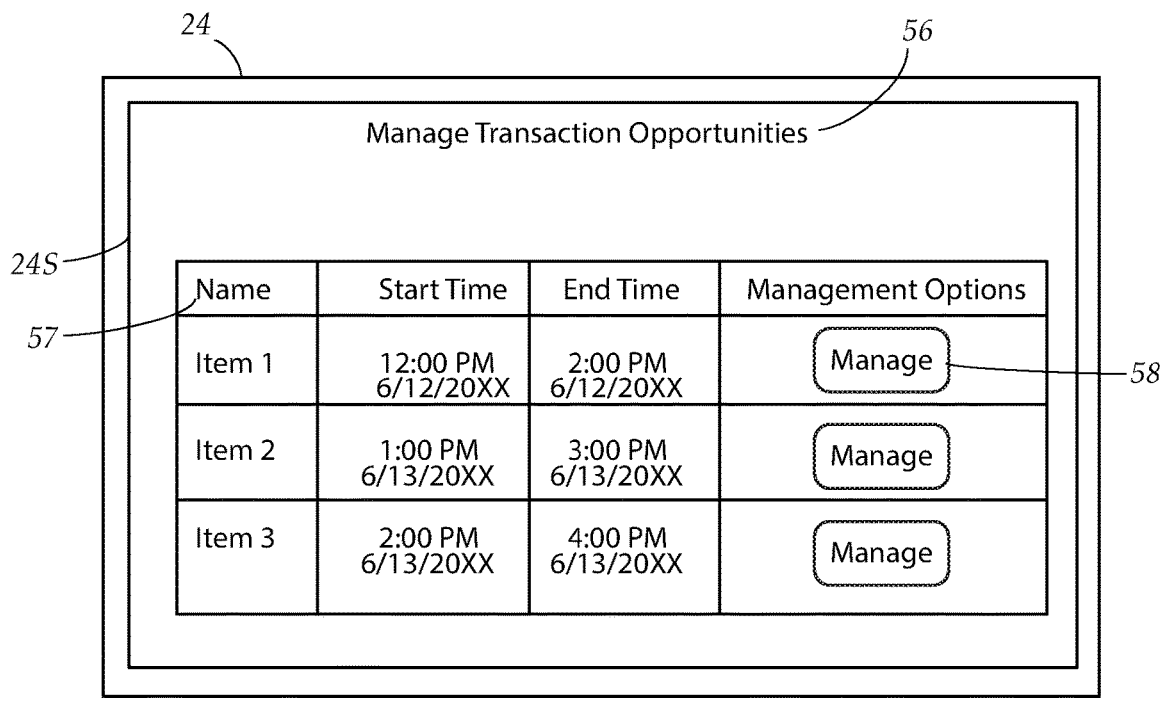
FIG. 5B is a diagrammatical front view of the transaction administrator device displaying a transaction opportunity management interface, in accordance with an embodiment in the present disclosure.

Referring now to FIG. 5B as well as FIG. 2 and FIG. 3, the transaction application 22 allows the transaction administrator user 28 to manage existing transaction opportunities via management controls 58 which allow to view, edit, and delete the existing transaction opportunity via its associated transaction opportunity record 44. The transaction application 22 may present the transaction administrator user 28 with a transaction management interface 56 containing a transaction opportunity list 57 displaying each transaction opportunity, thereby allowing the transaction administrator user 28 to select and manage specific transaction opportunities. In certain embodiments, the management controls 58 also allow the transaction opportunity to be manually initiated or paused, independently of the offer timing information 48T.

Figure 5C:
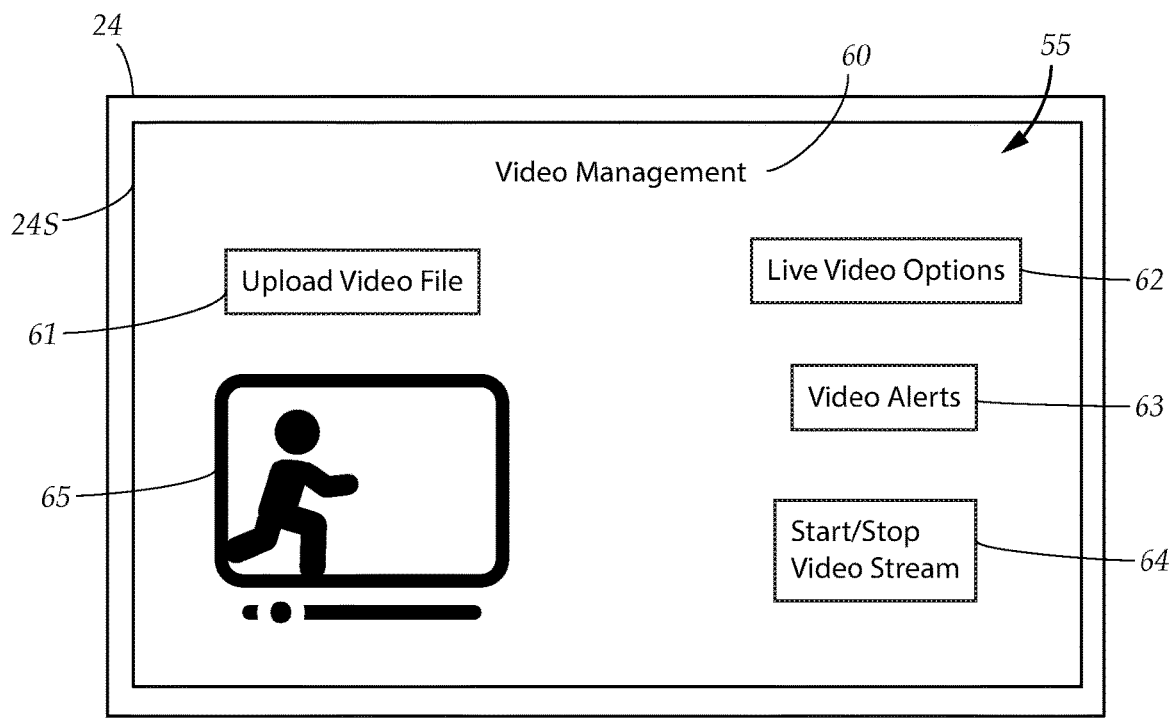
FIG. 5C is a diagrammatical front view of the transaction administrator device displaying a video management interface, in accordance with an embodiment in the present disclosure.

Turning now to FIG. 5C while also referring to FIGS. 1, 2, and 3, the transaction application may present the transaction administrator user 28 with various video options 55 via a video management interface 60. In a preferred embodiment, the promotional video content is presented to the buyer users 27 either in the form of live video 62 delivered in real-time, or as prerecorded video files 61, and the transaction application 22 allows the transaction administrator user 28 to choose whether the promotional video content of the transaction opportunity will be live or prerecorded. The promotional video content is presented in synchronization 43 with the transaction opportunity, for the purpose of describing the transaction subject and/or encouraging the buyer users to submit a transaction response 42.

In one embodiment, the video-based transaction system 10 further has a video upload device 26V as well as a camera 26C. The camera 26C may correspond to any device capable of recording video imagery, while the video upload device 26V corresponds to a computing device adapted to transmit the video captured by the camera 26C to the transaction video server 30 as video data 38D. In certain embodiments, a single device, such as a camera equipped smartphone, may perform the functions of both the camera 26C and the video upload device 26V. Similarly, in certain embodiments, a single computing device may fulfill the roles of both the transaction administrator device 24 as well as the video upload device 26V. Note that in an alternate embodiment, the transaction administrator device 24 and the video upload device 26V may be positioned within separate physical locations. When the live video option 62 is selected for the transaction opportunity, the transaction management module 14 may be adapted to transmit a video alert 63 to the transaction administrator device 24 and/or the video upload device 26V prior to the execution of the transaction opportunity to allow the transaction administrator user 28 or a video operator to prepare to capture the live video. Where prerecorded video files are employed, the transaction video server 30 will automatically load the appropriate transaction video file 37 stored on the video storage device. The video management interface 60 may also allow a video preview 65 depicting the promotional video content to be displayed, and allow the transaction administrator user 28 to manually start or stop transmission of the promotional video content to the user devices 20 of the buyer users 27.

Figure 6A:
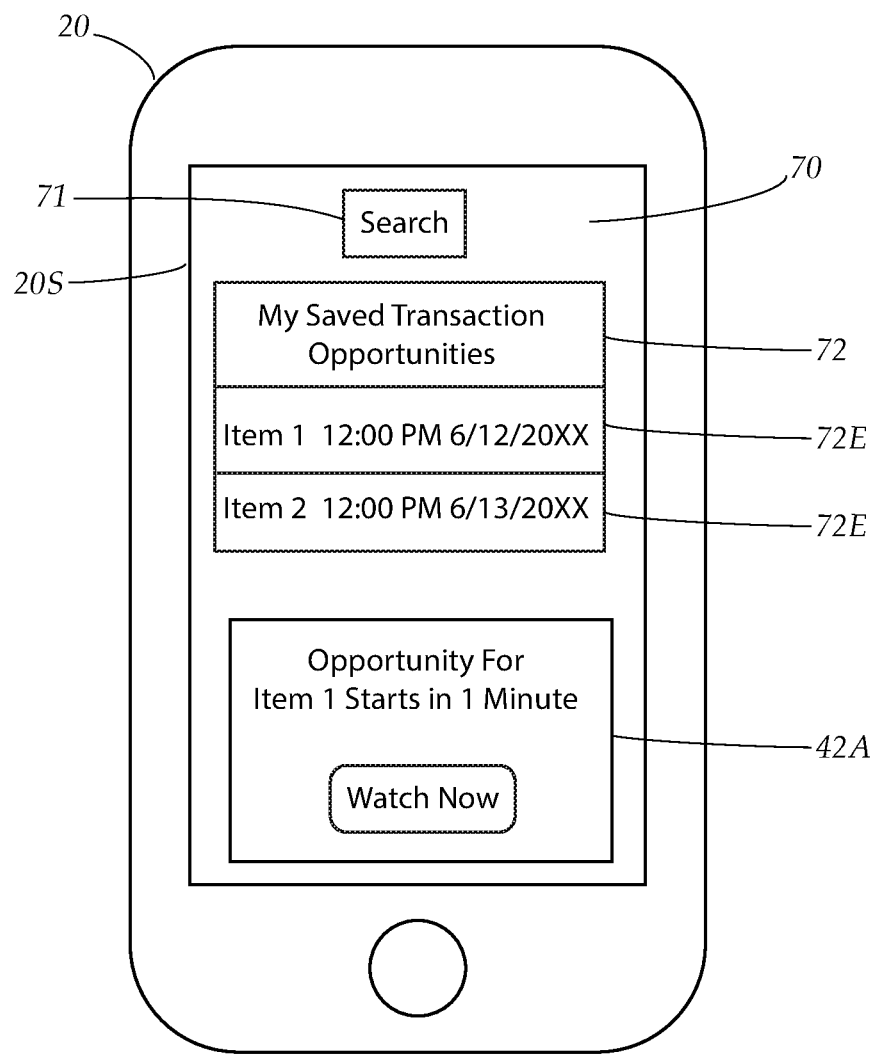
FIG. 6A is a diagrammatical front view of a user device, displaying a buyer user interface, in accordance with an embodiment in the present disclosure.

Turning now to FIG. 6A while also referring to FIG. 2 and FIG. 3, the transaction application 22 is further adapted to present each buyer user 27 with appropriate buyer controls via the user device 20 of the buyer user 27, allowing the buyer user 27 to search for, view, and respond to transaction opportunities. In one embodiment, the transaction application 22 is adapted to present each buyer user 27 with a buyer user interface 70 via the user device screen 20S providing access to a search function 71 which allows the existing transaction opportunities to be searched and filtered using various search parameters, as well as a transaction opportunity list 72 containing one or more transaction opportunity entries 72E corresponding to search results, or transaction opportunities which the buyer user 27 has saved. The buyer user 27 may select any of the transaction opportunity entries 72E to view the transaction details associated with the selected entry 72E, as well as view any images or descriptions associated therewith. Furthermore, the transaction application 22 may be adapted to present the buyer user 27 with a transaction alert 42A prior to the execution of a transaction opportunity in order to inform or remind the buyer user 27 of the transaction opportunity. The transaction alerts 42A may be transmitted automatically by the transaction management module 14, or may be manually transmitted by a transaction administrator user 28 via the transaction controls.

Figure 6B:
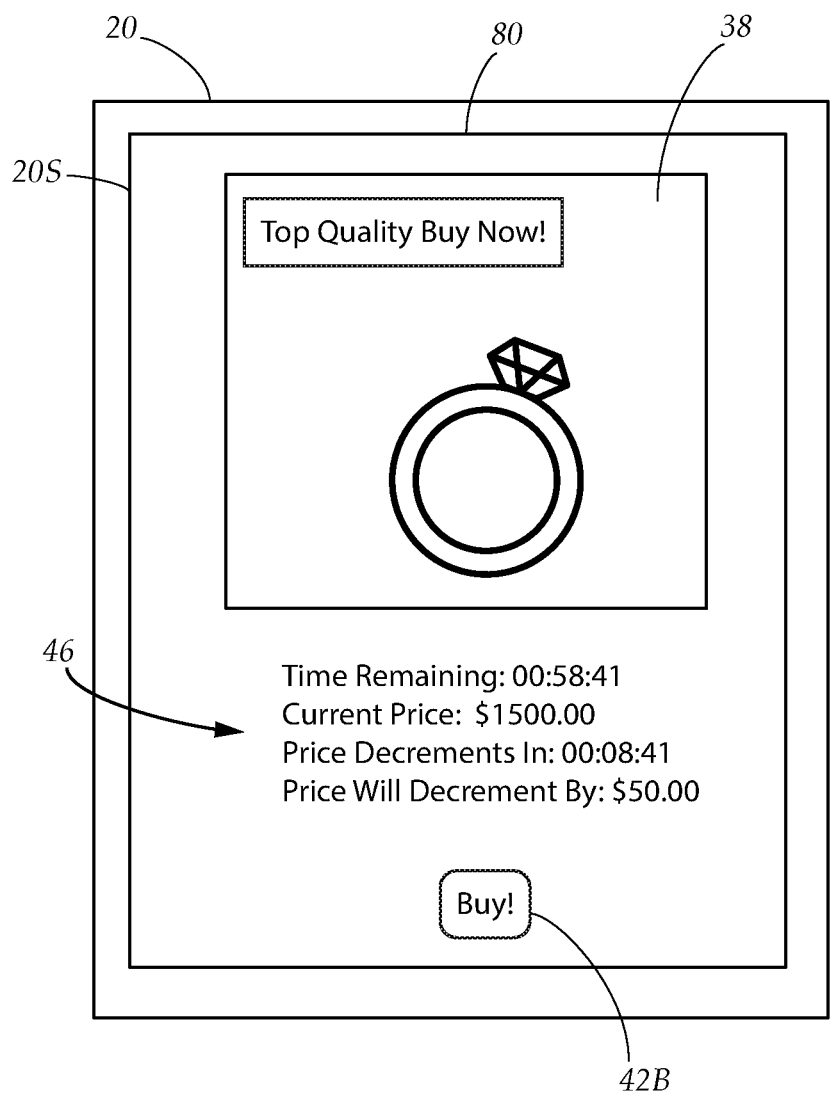
FIG. 6B is a diagrammatical front view of the user device, displaying a transaction opportunity interaction interface, in accordance with an embodiment in the present disclosure.

Turning now to FIG. 6B while also referring to FIGS. 2 and 3, once a transaction opportunity has begun, the transaction application 22 may present the buyer user 27 with a transaction opportunity interaction interface 80 via the user device screen 20S. In a preferred embodiment, the transaction opportunity interaction interface 80 contains a video display portion 38 through which the promotional video content for the transaction opportunity is presented, as well as a transaction response control element 42B, such as an on-screen button, which allows the buyer user to submit a transaction response 42 in reaction to the transaction opportunity. The transaction opportunity interaction interface 80 further displays the transaction details 46 of the transaction opportunity, allowing the buyer user 27 to view the offer duration and offer value, as well as the decrement interval and decrement value. Furthermore, the transaction alerts 42A (as shown in FIG. 6A) may include an acknowledgement function which allows the transaction application to automatically display the transaction opportunity interaction interface 80 upon the buyer user 27 acknowledging the transaction alert 42A.

Figure 4:
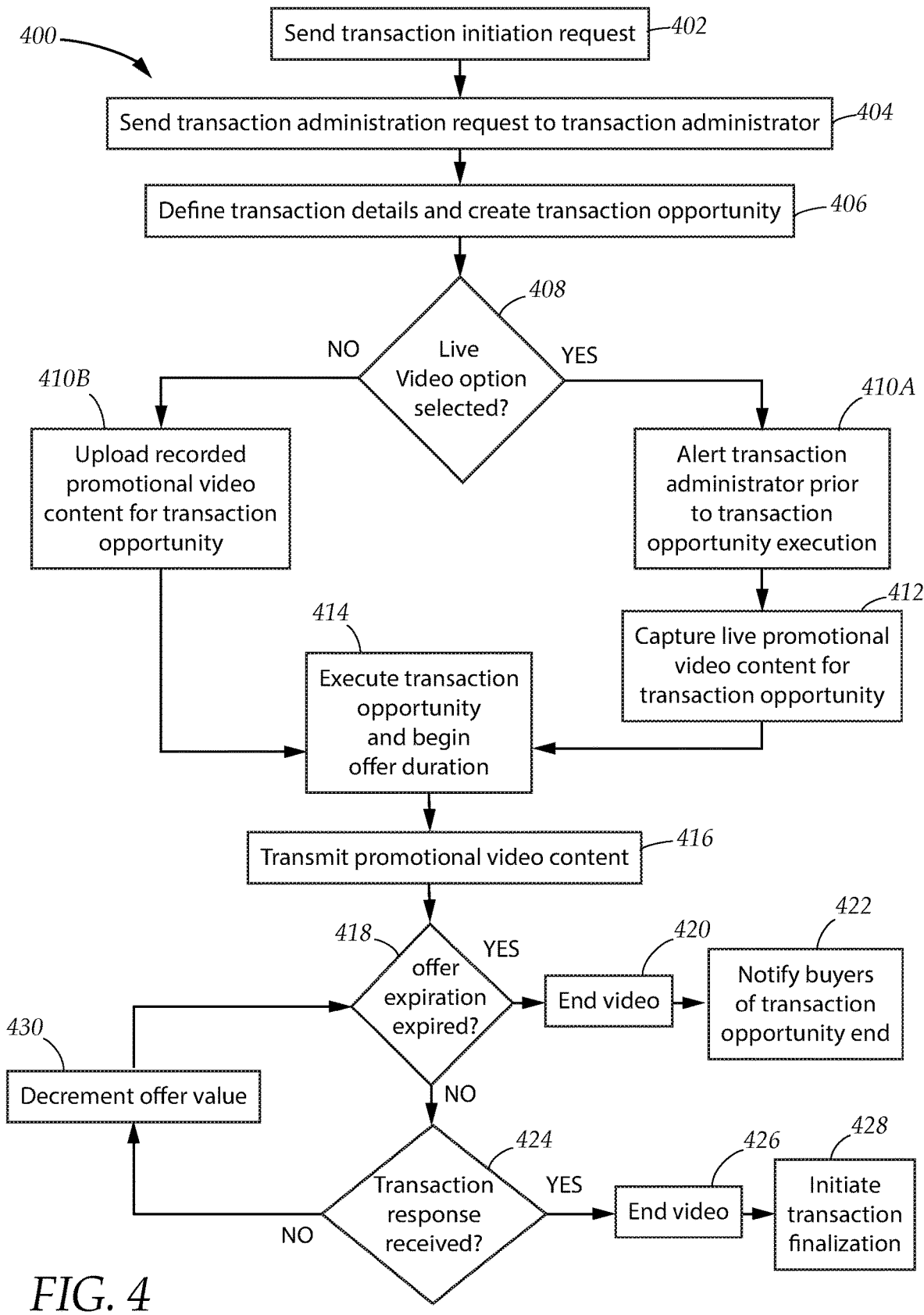
FIG. 4 is a flowchart depicting an exemplary transaction opportunity process, in accordance with an embodiment in the present disclosure.

Turning now to FIG. 4, while also referring to FIGS. 1 and 2, the features of the video-based transaction system 10 will be summarized using an exemplary transaction opportunity execution process 400. Beginning at step 402, the transaction originator 29 sends a transaction initiation request 39A to the transaction server 12, along with a description of the transaction subject. Next, at step 404, the transaction management module 14 sends a transaction administration request 39B to the transaction administrator user 28. Referring to FIGS. 2 and 3 as well as FIG. 4, at step 406, the transaction administrator user 28 creates a transaction opportunity for the transaction subject and defines the transaction details, including the offer value 48V, offer timing data 48T, decrement interval 48D, and decrement value 48DV, resulting in the creation of a transaction opportunity record 44 for the transaction opportunity.

At step 408, the transaction administrator user 28 selects whether to utilize live video or prerecorded video for the transaction opportunity. If live video is selected, the process proceeds to step 410A, and the transaction management module 14 will notify the transaction administrator 28 prior to the execution of the transaction opportunity via a video alert, followed by the capture of the live promotional video content for the transaction opportunity at step 412. However, if the transaction administrator user 28 chooses to employ prerecorded video, the requisite video data may be uploaded to the transaction video server 30 for subsequent transmission at step 410B.

Next, at step 414, the transaction opportunity is executed, either automatically by the transaction management module 14 upon the occurrence of the transaction start time, or manually by the transaction administrator user 28 via the transaction controls provided by the transaction application 22. At step 416, the promotional video content associated with the transaction opportunity is transmitted to the user devices 20 of the buyer users 27 concurrently with the execution of the transaction opportunity. In the present example, the offer duration corresponds to one hour, and the offer value is $1500 at the start of the offer duration. The decrement interval 48D corresponds to a period of ten minutes, and the decrement value 48DV corresponds to $50. At step 418, the transaction management module 14 determines whether the offer duration has expired. If the offer duration has expired, the process proceeds to step 420 and transmission of the promotional video content ends, and the transaction server will notify each of the buyer users 27 of the ending of the transaction opportunity at step 428.

Continuing to refer to FIGS. 2-3 and FIG. 4, if the offer duration has not expired, the process continues to step 424, and the transaction management module 14 determines whether a transaction response 42 has been submitted by any of the buyer users 27 who are viewing the transaction opportunity. If any transaction response 42 has been received in reaction to the transaction opportunity, the process proceeds to step 426. The transmission of the promotional video content is ended, and the buyer users 27 are notified of the end of the transaction opportunity. Next, at step 428, the transaction management module 14 will initiate a transaction finalization process between the transaction originator 29, and the buyer user 27 who submitted the transaction response 42. The final offer value will be equal to the monetary value of the offer value at the time the transaction response 42 is submitted. However, if no transaction response has been received, the transaction management module 14 will decrement the offer value by the decrement value upon the elapsing of the decrement interval. Next, the process will return to step 418, thus repeating the process until either the offer duration expires or a transaction response 42 is received.

In the present example, the transaction management module 14 will continually decrement the offer value by $50 every ten minutes, until either the offer duration of one hour has expired, or upon the transaction server 12 receiving a transaction response 42 for the transaction opportunity. If one of the buyer users 27 submits a transaction response 42 forty-two minutes after the execution of the transaction opportunity, the offer value will have been decremented four times for a total value of $200, resulting in a final offer value of $1300. In certain embodiments, the transaction administrator user 28 may also define a minimum offer value, and the transaction management module 14 will end the transaction opportunity once the decremented offer value equals the minimum offer value.

Please note that the steps of the exemplary transaction opportunity execution process 400 may be rearranged, modified, or removed in adherence with the principles of the present disclosure.

In certain embodiments, the transfer subject may alternatively be a service, whereupon the successful finalization of the transaction opportunity, the transaction originator 29 is obligated to provide or facilitate performance of the service to the buyer user.

Figure 7:
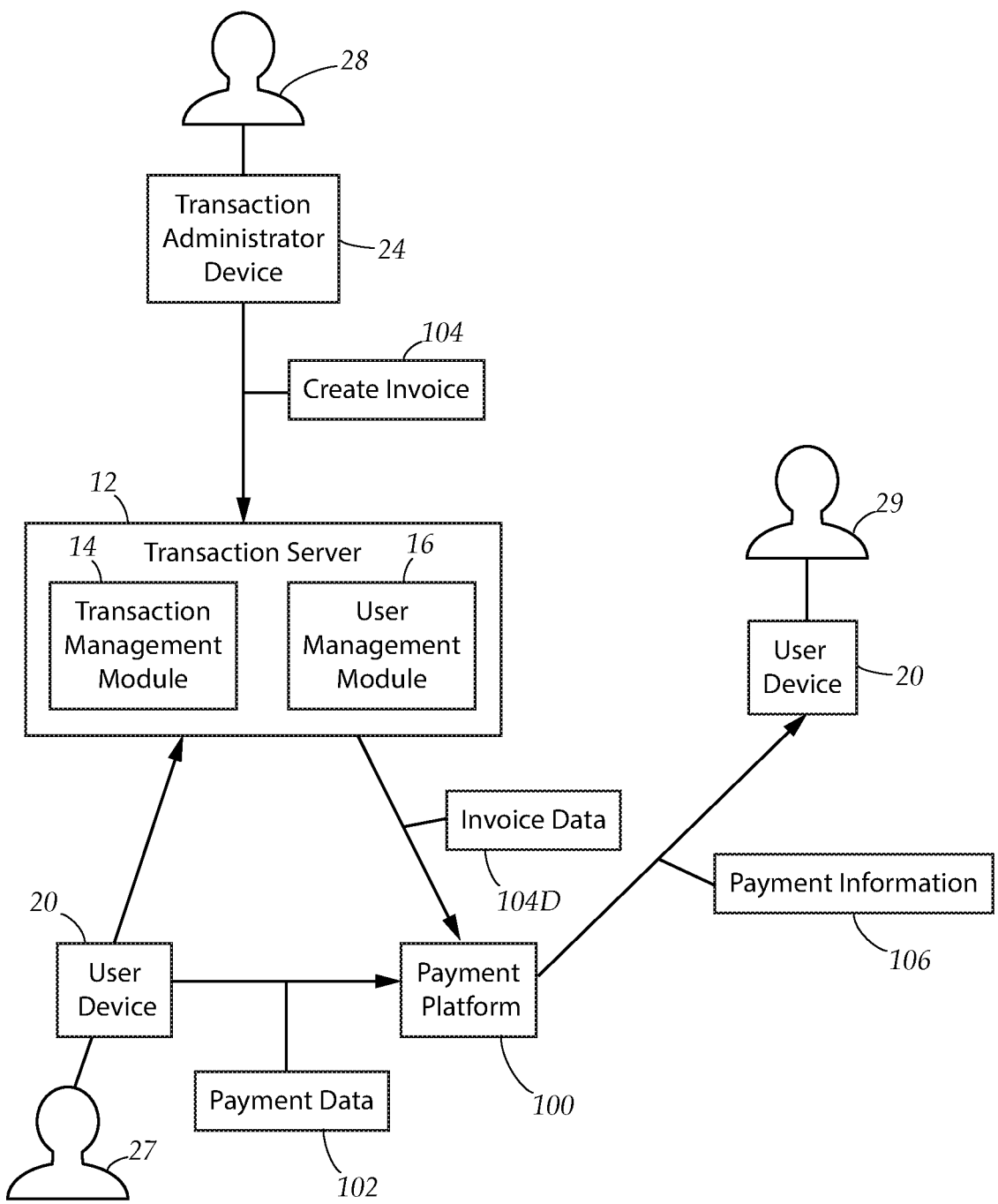
FIG. 7 is a block diagram depicting a transaction payment being performed using the video-based transaction system, in accordance with an embodiment in the present disclosure.

Turning to FIG. 7 while also referring to FIGS. 1-2 and FIG. 4, once one of the buyer users 27 submits a transaction response 42 and the transaction management module 14 initiates the transaction finalization process (such as at step 428 of FIG. 4), the buyer user 27 is deemed to have accepted the offer to purchase the transaction subject, and becomes obligated to pay the final offer value to the transaction originator 29. In a preferred embodiment, the transaction server 12 may either automatically generate 104 an invoice detailing the results of the transaction opportunity and the final offer value, or allow the transaction administrator user 28 to approve the outcome and initiate the generation 104 thereof. Once the invoice has been generated, the transaction management module 14 may refer the transaction originator 29 and the buyer user 27 via the transaction application 22 to a third party payment platform 100 adapted to execute e-commerce payments. The transaction management module 14 may also provide the payment platform 100 with invoice data 104D detailing relevant terms of the transaction. The payment platform 100 may then collect payment data 102 from the buyer user 27 via the user device 20, and transmit a payment confirmation 106 to the transaction originator 29. The payment is executed by the payment platform 100 independently of the video-based transaction system 10. Once the payment has been completed, the transaction originator is obligated to provide the transaction subject to the buyer user 27. Upon the successful completion of the payment, a percentage of the final offer value or other fee may be collected by the transaction administrator user and/or the operators of the video-based transaction system 10. Not that in alternate embodiments, various other payment methods may be employed in adherence with the principles of the present disclosure, as will be apparent to a person of ordinary skill in the art in the field of the invention.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a video-based transaction system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A video-based transaction system for facilitating a transfer or provision of a transaction subject, comprising:
    a plurality of user devices each adapted to allow one of a plurality of buyer users to access the video-based transaction system, each user device having a user device screen;
    a transaction administrator device adapted to allow a transaction administrator user to create a transaction opportunity having an offer duration and an offer value;
    a transaction server adapted to execute the transaction opportunity;
    a transaction video server having a video storage device, the video storage device is adapted to store a promotional video associated with the transaction opportunity, the transaction video server is further adapted to transmit the promotional video to the user devices concurrently with the offer duration for display via the user device screen; and
    wherein the transaction server is adapted to decrement the offer value of the transaction opportunity until the offer duration expires, and the user device is adapted to allow one of the buyer users to transmit a transaction response to the transaction server prior to the expiration of the offer duration, the transaction server is further adapted to end the transaction opportunity upon receiving the transaction response, allowing said buyer user to purchase the transaction subject at a final value equal to the offer value at the time of the transaction response.

2. The video-based transaction system as described in claim 1, further comprising a camera and a video upload device, the camera is adapted to capture live video, and the video upload device is adapted to transmit the live video to the transaction video server, whereby the live video corresponds to the promotional video, and transaction video server is further adapted to transmit the promotional video to the user devices in real-time.

3. The video-based transaction system as described in claim 2, wherein:
    the transaction administrator device is adapted to allow the transaction administrator user to define a decrement interval and a decrement value; and
    the transaction server is further adapted to decrement the offer value of the transaction opportunity each time the decrement interval elapses, whereby the offer value is decremented by an amount equal to the decrement value.

4. The video-based transaction system as described in claim 3, wherein the user device is further adapted to display a transaction opportunity interaction interface via the user device screen, the transaction opportunity interaction interface having a video display portion containing the promotional video content, a transaction information portion displaying the offer duration and the offer value, and with a response control element allowing the user to submit the transaction response.

5. The video-based transaction system as described in claim 4, wherein the user device is further adapted to allow a transaction originator to transmit a transaction initiation request, whereby the transaction originator is responsible for providing or transferring the transaction subject, and the transaction server is adapted to receive the transaction initiation request, whereupon the transaction server is adapted to transmit a transaction administration request to the transaction administrator device, prompting the transaction administrator user to create the transaction opportunity.

6. The video-based transaction system as described in claim 5, wherein the transaction server is further adapted to initiate a transaction finalization process via a payment platform, whereby the payment platform is adapted to facilitate payment of the final value between the buyer user who submitted the transaction response and the transaction originator.

7. The video-based transaction system as described in claim 6, wherein the transaction server is further adapted to transmit a transaction alert to the buyer users via the user device prior to the execution of the transaction opportunity, the user device is further adapted to display the transaction opportunity interaction interface upon the buyer user acknowledging the transaction alert.

8. A method for facilitating a transfer or provision of a transaction subject, comprising the steps of:
providing a plurality of user devices each having a user device screen, the user devices are adapted for use by a plurality of buyer users;
providing a transaction administrator device having a transaction administrator device screen;
providing a transaction server adapted to communicate with the transaction administrator device and the user devices;
providing a transaction video server;
creating a transaction opportunity and defining an offer duration and an offer value by the transaction administrator user using the transaction administrator device;
receiving promotional video content associated with the transaction opportunity by the transaction video server;
executing the transaction opportunity by the transaction server and streaming the promotional video content to the buyer users via the user devices;
decrementing the offer value of the transaction opportunity until the expiration of the offer duration;
transmitting a transaction response to the transaction server by one of the buyer users via the user device;
ending the transaction opportunity upon the transaction server receiving the transaction response; and
facilitating payment from said buyer user by the transaction server via a payment platform, and paying a final amount by the buyer user equal to the offer value of the transaction opportunity when the transaction response was received by the transaction server.

9. The method as recited in claim 8, wherein:
the step of providing the transaction video server is followed by the step of providing a camera and a video upload device;
the step of creating a transaction opportunity is followed by the step of capturing live video using the camera and transmitting the live video to the transaction video server using the video upload device;
the step of receiving promotional content further comprises receiving promotional video content associated with the transaction opportunity in the form of the live video; and
the step of executing the transaction opportunity by the transaction server further comprises streaming the promotional video content to the buyer users via the user devices in real-time.

10. The method as recited in claim 9, wherein:
the step of creating a transaction opportunity further comprises defining a decrement interval and a decrement value by the transaction administrator user; and
the step of decrementing the offer value further comprises decrementing the offer value by an amount equal to the decrement value each time the decrement interval elapses.

11. The method as recited in claim 10, wherein:
the step of executing the transaction opportunity is followed by the step of presenting the buyer users with a transaction opportunity interaction interface having a video display portion containing the promotional video content, and information portion displaying the offer duration and the offer value, and a response control element; and
the step of transmitting a transaction response further comprises transmitting a transaction response to the transaction server by one of the users pressing the response control element via the user device.

12. The method as recited in claim 11, wherein the step of creating a transaction opportunity is preceded by the step of transmitting a transaction initiation request to the transaction server by a transaction originator using one of the user devices, the transaction originator being responsible for providing or transferring the transaction subject.

13. The method as recited in claim 12, wherein the step of facilitating payment further comprises paying a final amount by the buyer user to the transaction originator equal to the offer value of the transaction opportunity when the transaction response was received by the transaction server.

14. The method as recited in claim 13, wherein the step of transmitting a transaction response further comprises preventing additional transaction responses from being submitted.

15. The method as recited in claim 14, wherein:
the step of executing the transaction opportunity is preceded by the step of transmitting a transaction alert to the buyer users via the user devices prior to the execution of the transaction opportunity; and
the step of presenting the buyer users with a transaction opportunity interaction interface further comprises automatically displaying the transaction opportunity interaction interface to each buyer user upon the buyer user acknowledging the transaction alert.

* * * * *